(12) United States Patent
Mizuno

(10) Patent No.: US 10,706,491 B2
(45) Date of Patent: Jul. 7, 2020

(54) DISPLAY DEVICE WITH MULTI-PROCESSOR, CONTROL METHOD FOR THE SAME, AND STORAGE MEDIUM HAVING CONTROL PROGRAM STORED THEREON

(71) Applicant: CASIO COMPUTER CO., LTD., Shibuya-ku, Tokyo (JP)

(72) Inventor: Kimiyasu Mizuno, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 144 days.

(21) Appl. No.: 14/822,015

(22) Filed: Aug. 10, 2015

(65) Prior Publication Data
US 2016/0063664 A1 Mar. 3, 2016

(30) Foreign Application Priority Data
Sep. 3, 2014 (JP) .................................. 2014-178975

(51) Int. Cl.
*G06F 3/14* (2006.01)
*G06T 1/20* (2006.01)
(Continued)

(52) U.S. Cl.
CPC .............. *G06T 1/20* (2013.01); *G06F 3/1438* (2013.01); *G06T 1/60* (2013.01); *G09G 3/2092* (2013.01);
(Continued)

(58) Field of Classification Search
CPC ..... G06T 1/20; G06T 1/60; G06T 3/40; G06F 3/14; G06F 13/385; G09G 2330/021; G09G 2300/023; G09G 2330/022; G09G 2330/026; G09G 2330/06; G09G 2340/0414; G09G 2340/0421;
(Continued)

(56) References Cited

U.S. PATENT DOCUMENTS 7,778,118 B2* 8/2010 Lyons .................... G04G 21/04
368/69
7,786,997 B2 8/2010 Yoshino et al.
(Continued)

FOREIGN PATENT DOCUMENTS

JP H11249754 A 9/1999
JP 2003515765 A 5/2003
(Continued)

OTHER PUBLICATIONS

Analog Clock in WPF, Sep. 17, 2008, Mohammad Dayyan.*
(Continued)

*Primary Examiner* — Ming Wu
(74) *Attorney, Agent, or Firm* — Holtz, Holtz & Volek PC

(57) ABSTRACT

A display device including a first processor, a second processor, a frame memory which is overwritten by and stores first image data generated by the first processor and second image data generated by the second processor, and a display on which a predetermined image is displayed based on the first image data and the second image data stored in the frame memory, in which the first processor or the second processor sets the first processor in a power saving state when the first processor is not overwriting the first image data in the frame memory.

15 Claims, 8 Drawing Sheets

(51) Int. Cl.
*G06T 1/60* (2006.01)
*G09G 3/20* (2006.01)

(52) U.S. Cl.
CPC ... *G09G 2340/12* (2013.01); *G09G 2340/145* (2013.01); *G09G 2360/144* (2013.01)

(58) Field of Classification Search
CPC ..... G09G 2340/0492; G09G 2340/145; G09G 2354/00; G09G 2358/00; G09G 2360/06; G09G 2360/08; G09G 2360/18; G09G 2370/16; G09G 2370/20; G09G 3/2092; G09G 3/3611; G09G 5/003; G09G 5/006; G09G 5/14; H04N 1/00915; H04N 1/32566; H04N 19/42; H04N 19/423; H04N 19/61; H04N 1/2137; H04N 1/32561; H04N 21/4181; H04N 21/42676; H04N 21/42692; H04N 21/4349; H04N 21/4436; H04N 21/4623; H04N 21/6118; H04N 21/64707; H04N 2201/0081; H04N 2201/0082; H04N 2201/0086; H04N 5/23238; H04N 5/33; H04N 5/4401; H04N 5/63; H04N 5/66; H04N 7/163; H04N 7/173; H04N 7/17309; H04N 7/17336; H04N 7/17345; H04L 12/2801; H04L 12/2852; H04L 12/64; H04L 12/6402; H04L 2012/5612; H04L 2012/5613; H04L 2012/5614; H04L 2012/5615; H04L 2012/5627; H04L 2012/5638; H04L 2012/5651; H04L 2012/5652; H04L 2012/5679; H04L 2012/6427; H04L 2012/6443; H04L 2012/6448; H04L 2012/6459; H04L 2012/6464; H04L 2012/6483; H04L 2012/6486; H04L 2012/6489; H04N 29/06; H04L 29/06027; H04L 49/107; H04L 65/1026; H04L 65/1036; H04L 69/08; Y10S 707/99945; Y10S 707/99948

See application file for complete search history.

(56) References Cited

U.S. PATENT DOCUMENTS

| | | | | |
|---|---|---|---|---|
| 2002/0075249 | A1* | 6/2002 | Kubota | G09G 3/2011 345/204 |
| 2005/0227761 | A1 | 10/2005 | Yoshino et al. | |
| 2006/0106966 | A1* | 5/2006 | Joos | G06F 13/385 710/305 |
| 2008/0189511 | A1* | 8/2008 | Watarai | G06T 1/60 711/217 |
| 2008/0313382 | A1* | 12/2008 | Nurmi | G06F 13/385 710/314 |
| 2009/0027306 | A1* | 1/2009 | Kawabe | G06F 1/162 345/3.1 |
| 2009/0027424 | A1 | 1/2009 | Kawabe | |
| 2009/0128447 | A1* | 5/2009 | Yoshikawa | G06F 3/1431 345/1.1 |
| 2009/0207178 | A1* | 8/2009 | Azar | G06F 3/14 345/502 |
| 2010/0110054 | A1* | 5/2010 | Gao | G09G 3/20 345/211 |
| 2012/0206461 | A1* | 8/2012 | Wyatt | G09G 5/003 345/501 |
| 2014/0082504 | A1* | 3/2014 | Stanton | G09G 5/003 715/738 |
| 2014/0181335 | A1 | 6/2014 | Han | |
| 2014/0267316 | A1* | 9/2014 | Connell | G06T 1/20 345/503 |
| 2016/0086299 | A1* | 3/2016 | Sharma | G06T 1/20 345/422 |
| 2016/0378319 | A1* | 12/2016 | Cho | H04M 1/72583 715/773 |

FOREIGN PATENT DOCUMENTS

| | | |
|---|---|---|
| JP | 2004288087 A | 10/2004 |
| JP | 2005287756 A | 10/2005 |
| JP | 2009025731 A | 2/2009 |
| JP | 2013140158 A | 7/2013 |
| JP | 2013143996 A | 7/2013 |
| JP | 2014142480 A | 8/2014 |

OTHER PUBLICATIONS

A pedestrian real-time clock figure, Feb. 3, 2006, Mathworks, https://www.mathworks.com/matlabcentral/fileexchange/3522-rtc--a-pedestrian-real-time-clock-figure.*

Japanese Office Action dated Jun. 11, 2018 (and an English translation thereof) issued in counterpart Japanese Application No. 2014-178975.

Japanese Office Action dated Sep. 9, 2019 (and English translation thereof) issued in Japanese Patent Application No. JP 2018-196156.

Office Action (Non-Final Rejection) dated May 6, 2020 issued in related U.S. Appl. No. 16/855,210.

* cited by examiner

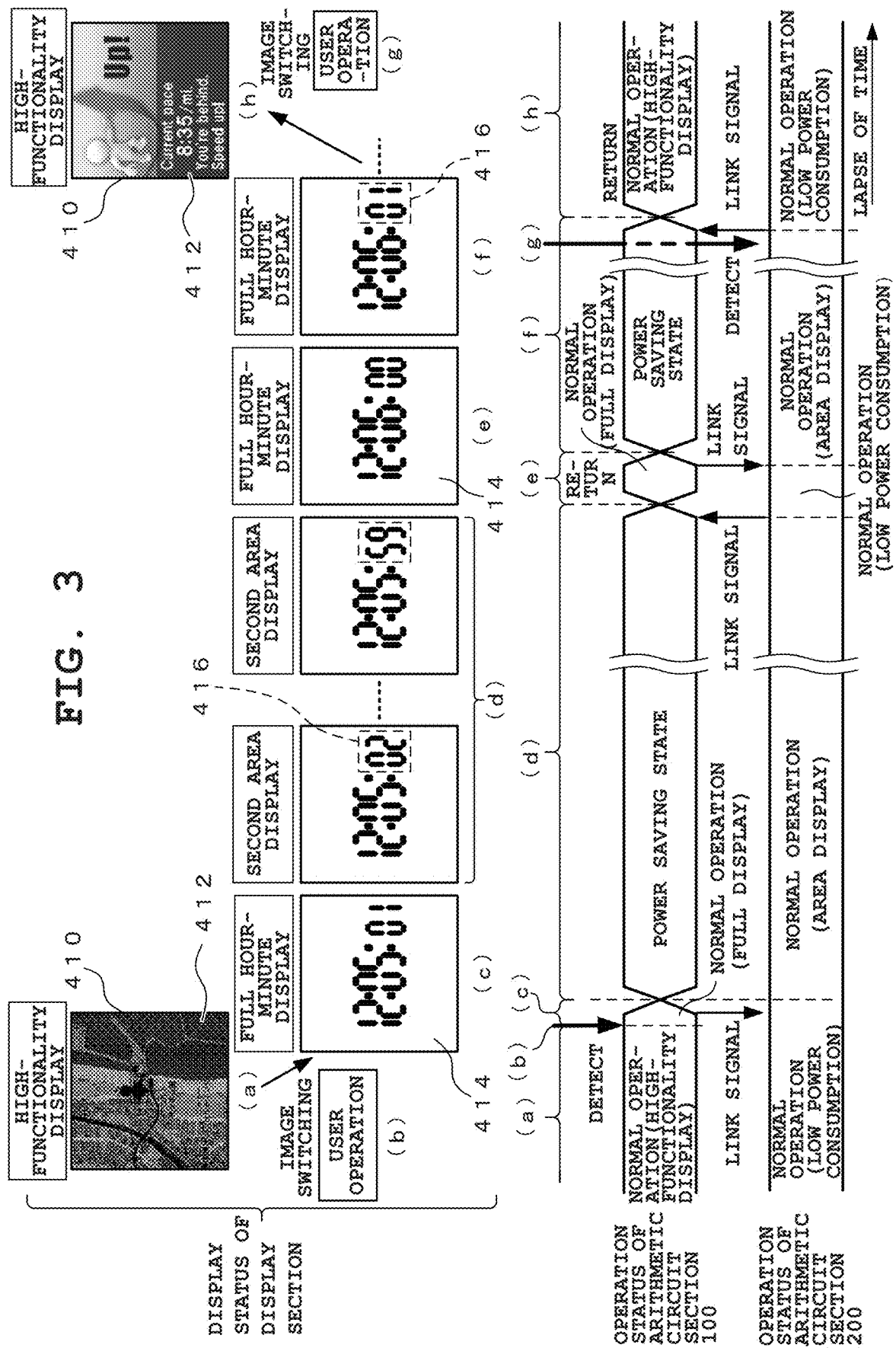

PRIOR ART

PRIOR ART

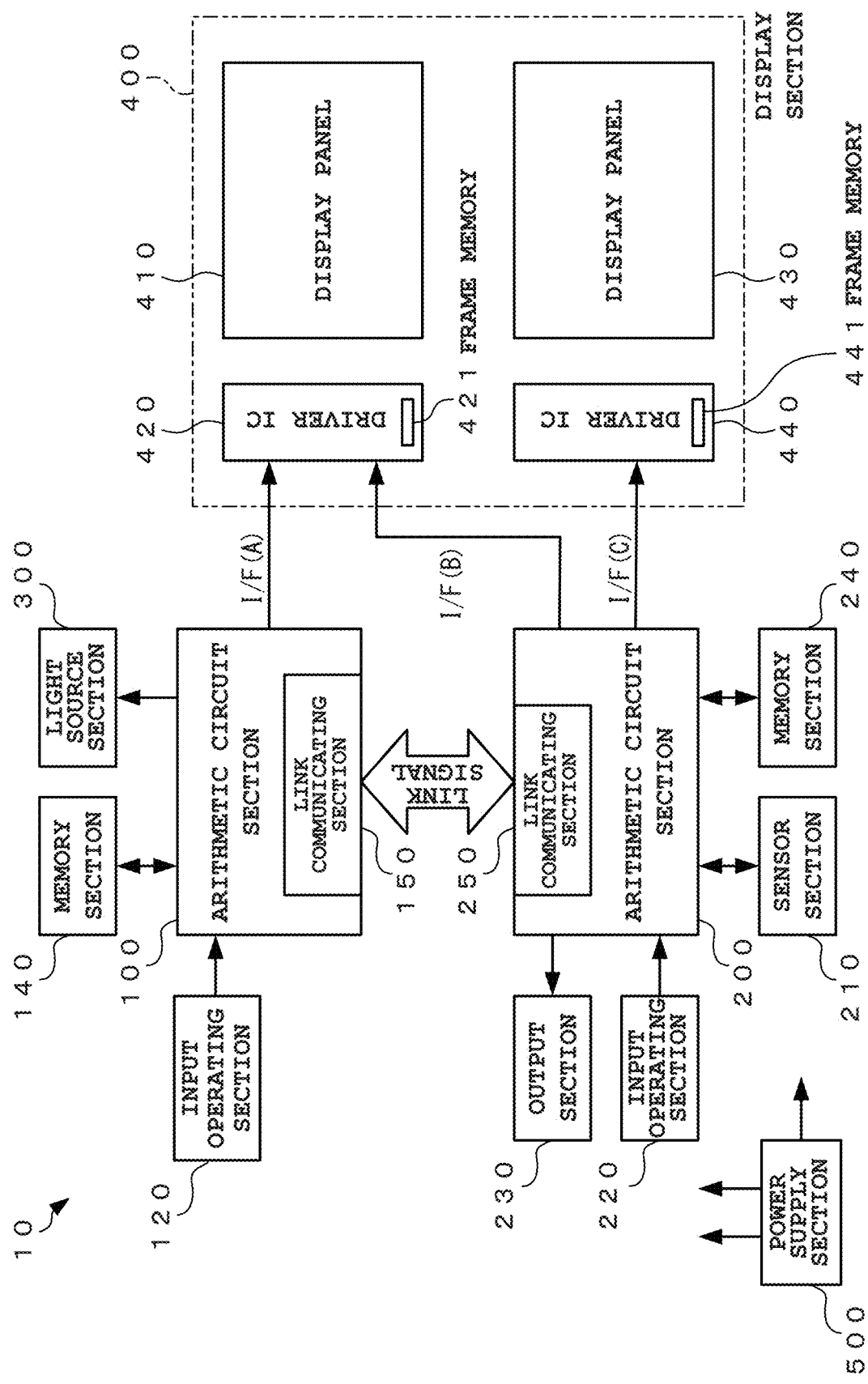

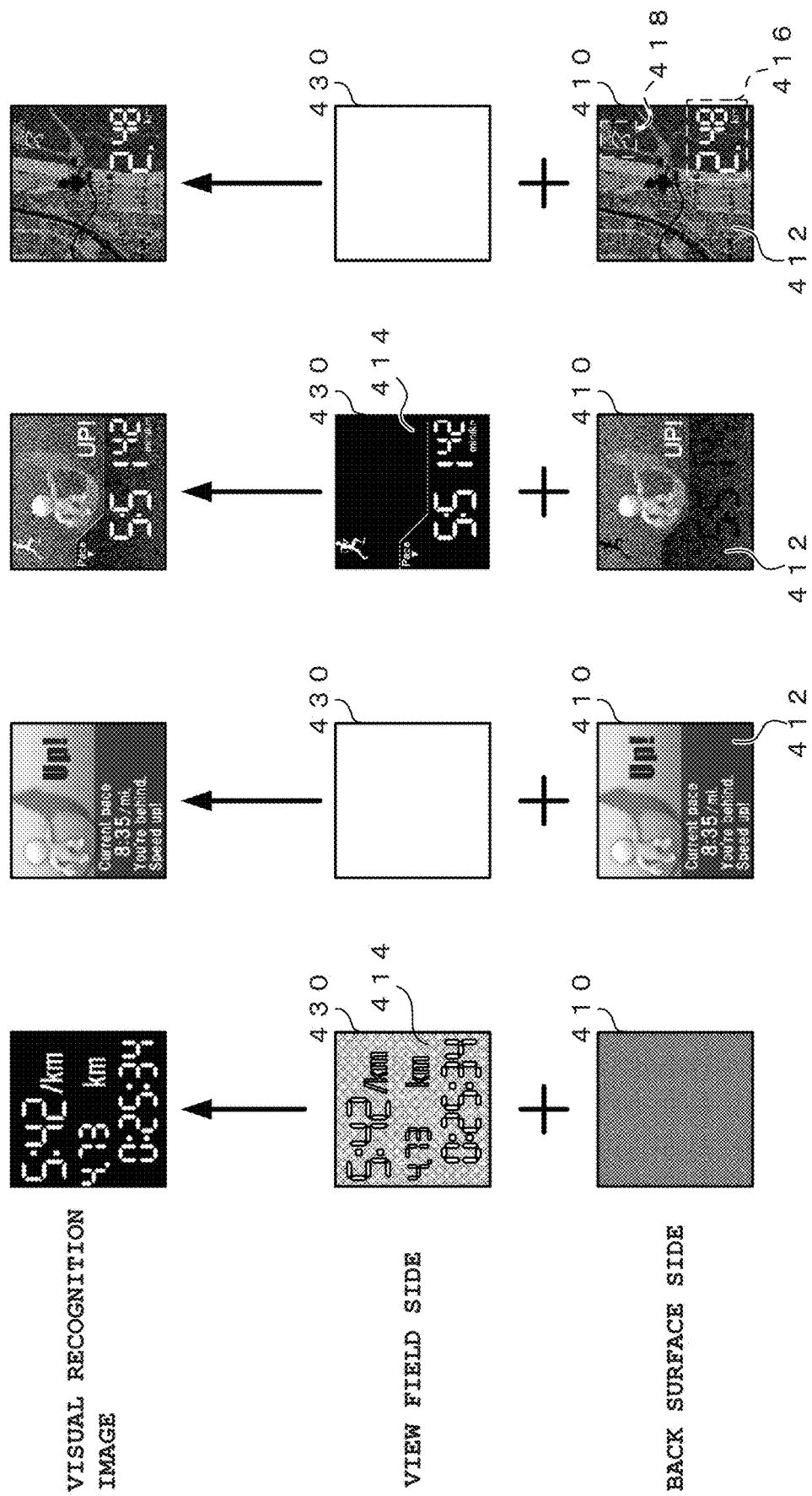

DISPLAY DEVICE WITH MULTI-PROCESSOR, CONTROL METHOD FOR THE SAME, AND STORAGE MEDIUM HAVING CONTROL PROGRAM STORED THEREON

CROSS-REFERENCE TO RELATED APPLICATION

This application is based upon and claims the benefit of priority from the prior Japanese Patent Application No 2014-178975, filed Sep. 3, 2014, the entire contents of which are incorporated herein by reference.

BACKGROUND OF THE INVENTION

1. Field of the Invention

The present invention relates to technology for display devices which display various information.

2. Description of the Related Art

In recent years, various products to be worn on the human body have been developed and available on the market for recording and analyzing various data at the time of exercise such as running, cycling, swimming, or trekking or in daily lives. Also, portable electronic devices such as portable telephones, smartphones (multifunctional portable telephones), and tablet terminals have been widely available. Most of these electronic devices include a display device for providing various information to its user.

For example, Japanese Patent Application Laid-Open (Kokai) Publication Nos. 2013-143996 and 2013-140158 each disclose a so-called sports watch that is worn on the body of a user for providing the user with various data collected at the time of exercise and analyzed, by displaying the data on a display device.

SUMMARY OF THE INVENTION

In accordance with one aspect of the present invention, there is provided a display device comprising: a first processor; a second processor; a frame memory which is overwritten by and stores first image data generated by the first processor and second image data generated by the second processor; and a display on which a predetermined image is displayed based on the first image data and the second image data stored in the frame memory, wherein the first processor or the second processor sets the first processor in a power saving state when the first processor is not overwriting the first image data in the frame memory.

In accordance with another aspect of the present invention, there is provided a display device comprising: a main central processing unit, a sub central processing unit, a display, a frame memory which stores display data to be displayed on the display, a first interface which connects the main central processing unit with the frame memory; and a second interface which connects the sub central processing unit with the frame memory, wherein the sub central processing unit transmits the display data to the frame memory via the second interface when a partial area of the frame memory is rewritten, wherein the main central processing unit transmits the display data to the frame memory via the first interface when an area of the frame memory larger than the partial area is rewritten, and wherein the main central processing unit is in a sleep state when the sub central processing unit is transmitting the display data.

In accordance with another aspect of the present invention, there is provided a method for controlling a display device including a main central processing unit, a sub central processing unit, a display, a frame memory which stores display data to be displayed on the display, a first interface which connects the main central processing unit with the frame memory, and a second interface which connects the sub central processing unit with the frame memory, comprising: a step of transmitting the display data to the frame memory by the sub central processing unit via the second interface when a partial area of the frame memory is rewritten, a step of transmitting the display data to the frame memory by the main central processing unit via the first interface when an area of the frame memory larger than the partial area is rewritten, and a step of causing the main central processing unit to be in a sleep state when the sub central processing unit is transmitting the display data.

In accordance with another aspect of the present invention, there is provided a non-transitory computer-readable storage medium having a display device control program stored thereon that is executable by a computer having a first processor and a second processor to actualize functions comprising: processing for overwriting a frame memory by first image data generated by the first processor and second image data generated by the second processor and storing the first image data and the second image data; processing for displaying a predetermined image on a display based on the first image data and the second image data stored in the frame memory; and processing for setting the first processor in a power saving state by the first processor or the second processor when the first processor is not overwriting the first image data in the frame memory.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram showing a timing chart of an example of a display device control method according to the first embodiment and an example of screen display by a display panel at each timing;

FIG. 7 is a schematic block diagram of a second embodiment of the electronic device including the display device according to the present invention;

FIG. 8A is a diagram showing an example of screen display by the display device according to the second embodiment;

FIG. 8B is a diagram showing another example of the screen display by the display device according to the second embodiment;

FIG. 8C is a diagram showing still another example of the screen display by the display device according to the second embodiment; and FIG. 8D is a diagram showing still another example of the screen display by the display device according to the second embodiment.

DETAILED DESCRIPTION OF THE PREFERRED EMBODIMENTS

Hereafter, embodiments of a display device, a control method therefor, a control program therefor, and an electronic device including the display device according to the present invention are described in detail.

First Embodiment (Display Device and Electronic Device)

Figure 1C:
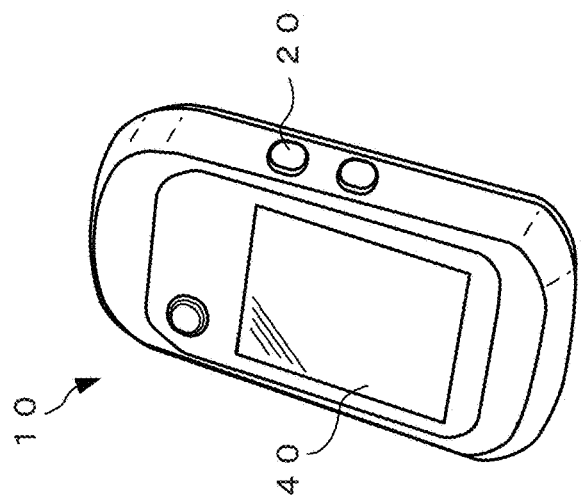
FIG. 1C is a schematic perspective view of still another specific example of the electronic device including the display device according to the present invention.
Figure 1B:
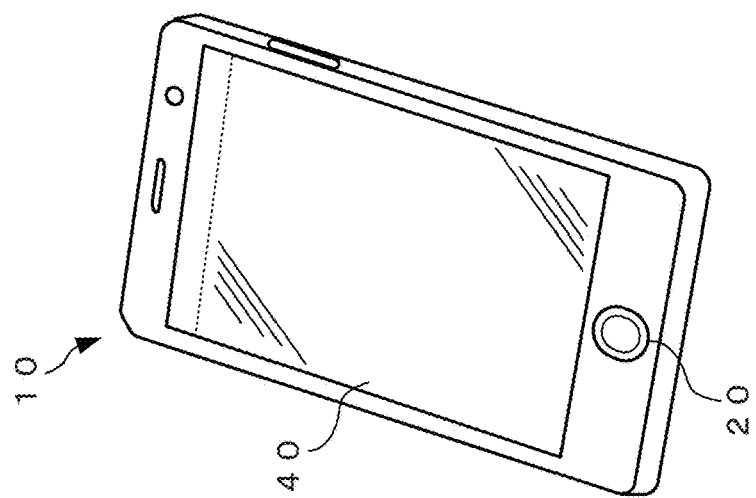
FIG. 1B is a schematic perspective view of another specific example of the electronic device including the display device according to the present invention.
Figure 1A:
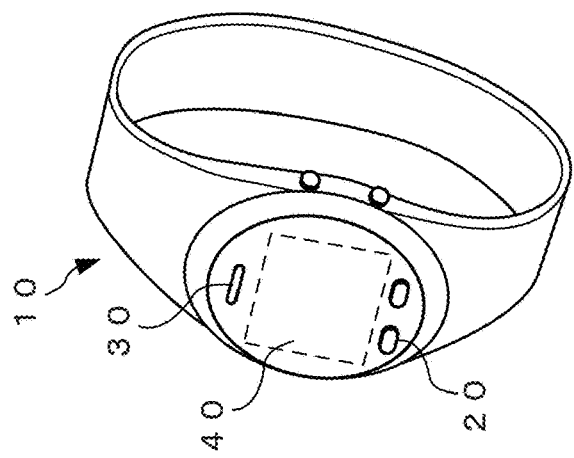
FIG. 1A is a schematic perspective view of a specific example of an electronic device including a display device according to the present invention.
Figure 2:
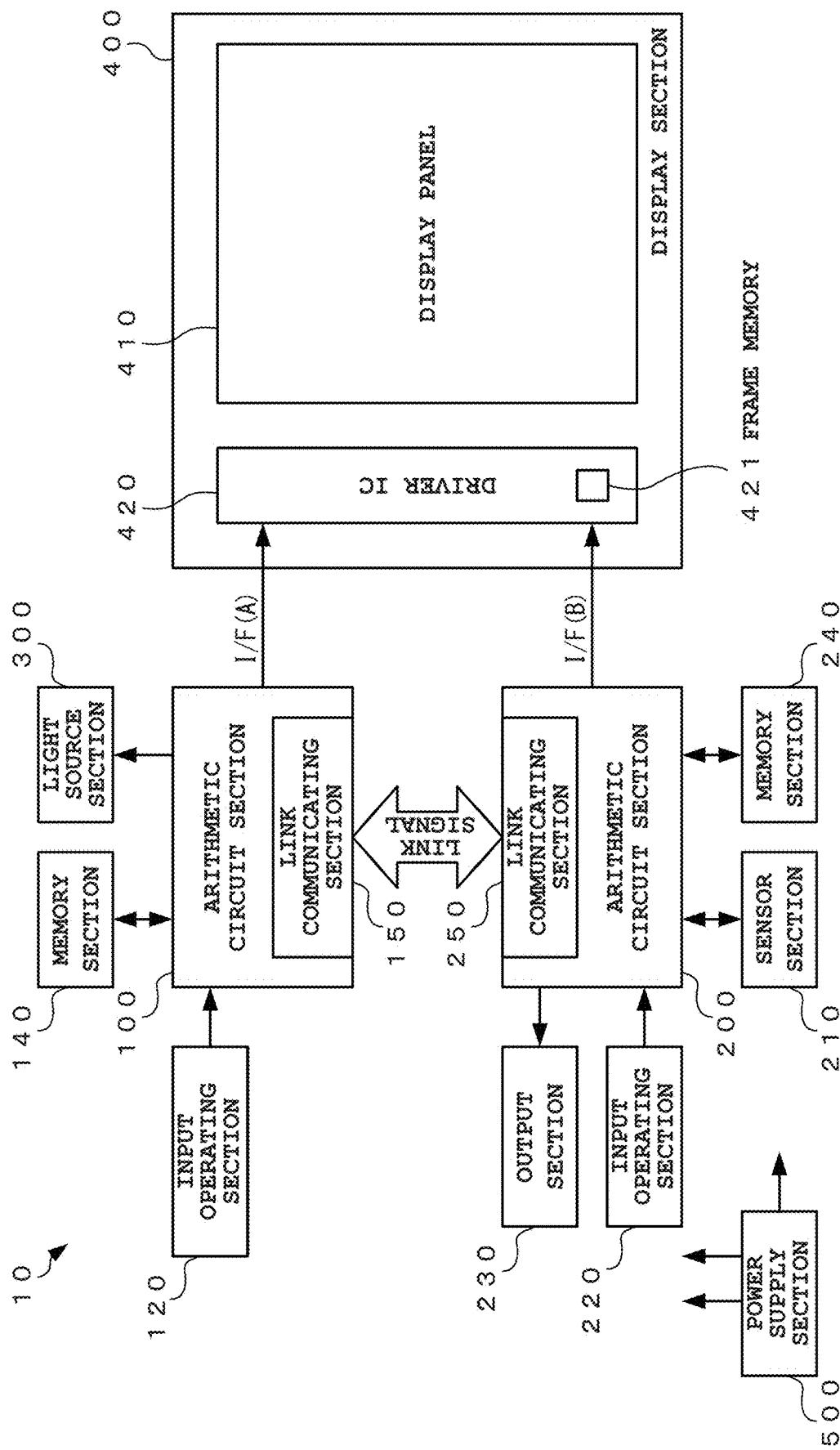
FIG. 2 is a schematic block diagram of a first embodiment of the electronic device including the display device according to the present invention.

FIG. 1A, FIG. 1B, and FIG. 1C are schematic perspective views of specific examples of an electronic device including a display device according to the present invention. FIG. 2 is a schematic block diagram of a first embodiment of the electronic device including the display device according to the present invention.

An electronic device 10 having a display device according to the present invention is structured to include, for example, a display panel 40 for displaying various information, as depicted in FIG. 1A to FIG. 1C. This electronic device 10 may have an outer appearance of a wristwatch type or wristband type. For example, the electronic device 10 may be a sports watch or a smartwatch that is worn on the body of a user, as depicted in FIG. 1A. Also, the electronic device 10 may be a smartphone or portable telephone, as depicted in FIG. 1B. Moreover, the electronic device 10 may be a portable device (such as a GPS logger) that is used outdoors, as depicted in FIG. 1C. Note that, in FIG. 1A to FIG. 1C, reference numeral 20 denotes an input operating section such as a button switch, and reference numeral 30 denotes an output section such as a loudspeaker or buzzer.

The electronic device 10 according to the present embodiment specifically has, for example, a set of two arithmetic circuit sections (first and second arithmetic circuits) 100 and 200, as depicted in FIG. 2. To the arithmetic circuit section 100, at least an input operating section (detecting section) 120, a memory section 140, a light source section 300, and a display section 400 are connected. To the arithmetic circuit section 200, at least a sensor section (detecting section) 210, an input operating section (detecting section) 220, an output section 230, a memory section 240, and a display section 400 are connected.

The arithmetic circuit section 100 is an arithmetic operation device such as a CPU (Central Processing Unit) or MPU (Micro Processor). By executing a predetermined control program or algorithm program, the arithmetic circuit section 100 performs control in accordance with an operation signal from the input operating section 120, or controls the display of various information in the display section 400 described below. Also, the arithmetic circuit section 100 is connected to the display section 400 via an interface meeting a standard with a relatively high data transfer rate, which is a serial interface such as MIPI (Mobile Industry Processor Interface) or a parallel interface, and transmits and receives a predetermined signal including image data generated by the arithmetic circuit section 100 to and from the display section 400 so as to display a predetermined image on the display section 400.

Also, the arithmetic circuit section 100, which includes a link communicating section 150, transmits and receives a predetermined link signal to and from the arithmetic circuit section 200 described below, and thereby controls at least the display status of the display section 400 by being linked and synchronized with the arithmetic circuit section 200.

The link communicating section 150 has a connection port of a synchronous serial communication standard such as UART (Universal Asynchronous Receiver Transmitter) or I2C (Inter-Integrated Circuit) and, by being connected to a link communicating section 250 described below, transmits and receives a predetermined link signal for controlling at least the display status of the display section 400.

The arithmetic circuit section 100 applied in the present embodiment has a processing power that is high enough to control high-functionality display on the display section 400. Here, in the present embodiment, the high-functionality display refers to, for example, high-definition color image display, smooth moving picture or animation display, display of an image having large-volume image data such as those for visual effects such as transition effects, display of an image with a large number of updates (a large update frequency) or with a large change (motion) of screen display.

That is, as the arithmetic circuit section 100, an arithmetic circuit having a relatively high processing power is adopted. Since this arithmetic circuit generally performs various processing operations with a high operating frequency, power consumption is large. In other words, as the arithmetic circuit section 100, an arithmetic circuit with a relatively high processing power and high power consumption (a high-power, high-performance processor) is required to be adopted. In the present embodiment, as the arithmetic circuit section 100, a circuit with a relatively high operating frequency of, for example, several hundreds of MHz to 1 GHz is applied to achieve image writing at a relatively high frame rate such as 30 fps or 60 fps.

Here, the control program and the algorithm program to be executed by the arithmetic circuit section 100 may be stored in the memory section 140 or may be incorporated in advance inside the arithmetic circuit section 100.

The input operating section 120 is input means such as a touch panel arranged on the view field side of a display panel (corresponding to the display panel 40 depicted in FIG. 1A to FIG. 1C) provided on the display section 400 described below, and outputs various operation signals generated by a user input operation to the arithmetic circuit section 100. As a result, in the arithmetic circuit section 100, items and information to be displayed on the display section 400 are selected and set.

The memory section 140 has stored therein data for use and generated in executing a predetermined control program and algorithm program by the arithmetic circuit section 100, data for display on the display section 400, and the like.

Also, the memory section 140 may have stored therein a control program and algorithm program that is executed by the arithmetic circuit section 100. Note that the memory section 140 may be partially or entirely in a form of a removable storage medium such as a memory card, and may be structured to be removable from the electronic device 10.

As with the above-described arithmetic circuit section 100, the arithmetic circuit section 200 is an arithmetic operation device such as a CPU or MPU. By executing a predetermined control program or algorithm program, the arithmetic circuit section 200 controls, for example, a sensing operation by the sensor section 210, a processing operation in accordance with an operation signal from the input operating section 220, the provision of various information by the output section 230, and the display of various information on the display section 400 described below.

Also, the arithmetic circuit section 200 is connected to the display section 400 via an interface meeting a standard with a relatively low data transfer rate, such as SPI (Serial Peripheral Interface). By transmitting and receiving a predetermined signal including image data generated by the arithmetic circuit section 200 to and from the display section 400, the arithmetic circuit section 200 causes a predetermined image to be displayed on the display section 400. Also, the arithmetic circuit section 200 includes a link communicating section 250 having a structure equivalent to that of the link communicating section 150 provided to the above-described arithmetic circuit section 100. By transmitting and receiving a predetermined link signal to and from the above-described arithmetic circuit section 100, the arithmetic circuit section 200 controls at least the display status of the display section 400 by being linked and synchronized with the arithmetic circuit section 100.

Here, the arithmetic circuit section 200 applied in the present embodiment is only required to have a processing power that is enough to control the sensor section 210 which periodically performs sensing operations, and the like. That is, as the arithmetic circuit section 200, an arithmetic circuit having a relatively low processing power can be adopted. Since this arithmetic circuit can generally perform a processing operation with low operating frequency, power consumption can be saved.

In other words, as the arithmetic circuit section 200, an arithmetic circuit with a relatively low processing power and low power consumption already provided to the electronic device 10 for use in, for example, a clock that is continuously operated (a low-power and low-performance processor) can be adopted. In the present embodiment, an arithmetic circuit having a relatively low operating frequency of several MHz to several tens of MHz is adopted to achieve a favorable sensing operation by the sensor section 210. That is, as the arithmetic circuit section 200, an arithmetic circuit with an operating frequency lower than that of the arithmetic circuit section 100 is adopted. As a result, when the arithmetic circuit section 200 and the arithmetic circuit section 100 are operated under the same conditions, the power consumption of the arithmetic circuit section 200 is lower.

Here, the control program and the algorithm program to be executed by the arithmetic circuit section 200 may be stored in the memory section 240 or be incorporated in advance inside the arithmetic circuit section 200.

The sensor section 210 is sensor means such as an acceleration sensor, gyro sensor, geomagnetic sensor, atmospheric pressure sensor, temperature-humidity sensor, pulse sensor, and heart rate sensor, or positioning means including a GPS receiving section. The sensor section 210 acquires various physical, biological, and/or geographical data of the user during exercise or in the daily life (hereinafter collectively referred to as "sensor data") and outputs it to the arithmetic circuit section 200. Here, the sensors such as an acceleration sensor, gyro sensor, and geomagnetic sensor perform sensing operations during the user's exercise at 100 or more cycles per second (a sampling frequency equal to or more than 100 Hz), and output sensor data to the arithmetic circuit section 200. Also, the positioning means by GPS performs a sensing operation in a cycle of, for example, once in one to several seconds, and outputs positioning data to the arithmetic circuit section 200.

The input operating section 220 is input means (corresponding to the input operating section 20 depicted in FIG. 1A and FIG. 1B) such as a button switch, slide switch, or microphone provided on the housing of the electronic device 10, and outputs various operation signals generated in response to the user's input operations to the arithmetic circuit section 200. As a result, the arithmetic circuit section 200 performs the setting and control of the above-described sensing operation by the sensor section 210, and the selection, setting, and the like of item and information to be displayed on the display section 400.

The output section 230, which is acoustic means such as a buzzer or loudspeaker or vibration means such as a vibration motor or vibrator, generates sound information such as a predetermined tone color, sound pattern, or audio message, or vibration information such as a predetermined vibration pattern or its intensity, and thereby aurally or tactually provides or informs the user with or of various information. Here, the output section 230 may generate predetermined sound information or vibration information in association with various information displayed on the display section 400 described below.

The memory section 240 stores sensor data and the like acquired by the sensor section 210 in a predetermined storage area. Also, the memory section 240 stores data that is used or generated when a predetermined control program or an algorithm program is executed by the arithmetic circuit section 200. This memory section 240 may store a control program and an algorithm program to be executed by the arithmetic circuit section 200. Note that the memory section 240 may be integrally structured with the memory section 140 connected to the arithmetic circuit section 100 described above.

The light source section 300 includes, although omitted in the drawings, a backlight and a backlight driving circuit, and controls the light-emitting status of the back light in accordance with the display status of the display section 400 and a user input operation by the input operating sections 120 and 220 described below. The backlight is arranged on the back surface side (opposite to the user view field side) of the transmission-type display panel. As the backlight, for example, a surface light source using a plurality of LEDs (Light-Emitting Elements) and various optical members such as a light-guide plate and light diffusion film is applied. The backlight driving circuit controls the light on (ON) and light off (OFF) states of the backlight based on a control signal outputted from the arithmetic circuit section 100. Note that the backlight driving circuit may control the light-emitting status of the backlight based on, in addition to a control signal from the arithmetic circuit section 100, a control signal from the arithmetic circuit section 200 which operates in conjunction with the arithmetic circuit section 100.

The display section 400 includes a transmission-type display panel (a first display panel) 410 and a driver circuit (represented as "driver IC" in the drawing) 420 having a frame memory 421 incorporated therein, as depicted in FIG. 2. As the display panel 410, for example, a transmission-type TFT (Thin Film Transistor) color liquid-crystal panel can be adopted, which displays various information generated by the arithmetic circuit section 100 and the arithmetic circuit section 200 in a predetermined form. Here, in the present embodiment, the display panel 410 is controlled by the driver circuit 420 so as to achieve high-functionality display.

The driver circuit 420 also has a plurality of interfaces for receiving a predetermined signal including image data from each of the arithmetic circuit section 100 and the arithmetic circuit section 200 via a separate signal line. Specifically, the driver circuit 420 is connected to the arithmetic circuit section 100 via a serial interface such as MIPI or a parallel interface (represented as "I/F(A)" in the drawing), and to the arithmetic circuit section 200 via a serial interface such as a SPI (represented as "I/F(B)" in the drawing). In particular, in the present embodiment, the frame memory 421 incorporated in the driver circuit 420 is sequentially overwritten by image data and the like transmitted via the above-described separate interface for storage.

That is, when image data from one of the arithmetic circuit section 100 and the arithmetic circuit section 200 has been written in the frame memory 421, if image data is written from the other one, overwriting is performed such that the latter image data becomes effective. Here, by specifying an address at the time of writing the image data, only image data at the corresponding address of the image data already written in the frame memory 421 is overwritten. Note that the timing of transmitting image data from each of the arithmetic circuit section 100 and the arithmetic circuit section 200 to the driver circuit 420 is controlled by a link signal being transmitted between the arithmetic circuit section 100 and the arithmetic circuit section 200 for mutual linkage and synchronization.

As a result, in the present embodiment, when the backlight provided on the back surface side is lit with a predetermined color image, moving picture, or the like based on the image data generated by the arithmetic circuit section 100 being displayed on the display panel 410 based on the characteristics of the transmission-type color display panel, a high-intensity color image or the like is projected and visually recognized by the user.

When the data volume of the image to be displayed on the display panel 410 is small or when the number of updates (update frequency) or a change (motion) of screen display is small, the arithmetic circuit section 100 and the arithmetic circuit section 200 are linked and synchronized with each other in accordance with the display status, whereby a specific image based on the image data generated by the arithmetic circuit section 200 to be displayed in a specifically addressed display area (a specific area). Note that an image display method in the display section 400 will be described in detail further below.

The above-described sections achieve each function by driving power supplied from the power supply section 500, as depicted in FIG. 2. Here, in the portable electronic device 10, a primary battery such as a commercially-available coin-shaped battery or button-shaped battery, a secondary battery such as a lithium-ion battery or a nickel-hydride battery, or the like is adopted as the power supply section 500. Also, in addition to the above-described primary battery and secondary battery, a power supply by energy harvest technology for generating electricity by energy such as vibrations, light, heat, and electro-magnetic waves can be used singly or in combination.

In the present embodiment, the arithmetic circuit section 100 and the arithmetic circuit section 200 are depicted as separate structures, as shown in FIG. 2. However, the present invention is not limited to thereto. For example, the arithmetic circuit section 100 and the arithmetic circuit section 200 may be integrally mounted on a single semiconductor in a form of System-on-a-chip (SOC). In this case as well, the interfaces I/F(A) and I/F(B) connecting the arithmetic circuit sections 100 and 200 and the display section 400 together for the transmission and reception of a predetermined signal are separately provided.

Although omitted in FIG. 2 in the above-described embodiment, the arithmetic circuit section 100 and the arithmetic circuit section 200 may include a communication interface section (hereinafter abbreviated as "communication I/F section") that transmits and receives various data and signals to and from a device provided outside the electronic device 10 (hereinafter referred to as an "external device") by a predetermined wired or wireless communication method. Here, in a case where a communication I/F section is provided in the (high-power, high-performance) arithmetic circuit section 100 and data and the like are transmitted and received to and from an external device (for example, a high-functionality information processing device such as a smartphone or personal computer) via wireless communication, a wireless communication method by which relatively large-volume data can be transmitted and received at highspeed is applied, such as Bluetooth (registered trademark) communication or Wi-Fi (wireless fidelity (registered trademark)) communication. On the other hand, in a case where a communication I/F section is provided in the (low-power, low-performance) arithmetic circuit section 200 and data are transmitted and received to and from an external device (for example, a sensor device mounted on another body part) via wireless communication, a wireless communication method with low power consumption, such as Bluetooth (registered trademark) low energy (BLE) communication, is applied.

(Display Device Control Method)

Next, a display device control method applied to the electronic device according to the present embodiment is described. Here, the control method is described by using a case where the portable electronic device 10 depicted in FIG. 1A to FIG. 1C is worn on the body of the user or carried by the user performing exercise such as running or walking or living in daily life and various information is displayed on the display panel 40 and provided to the user. Note that a series of processing operations described below are achieved by a predetermined algorithm program being executed by the arithmetic circuit section 100 and the arithmetic circuit section 200.

Figure 4C:
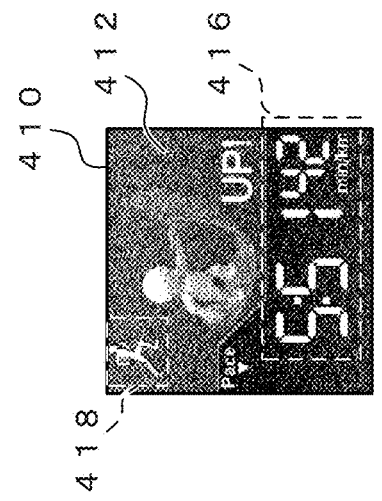
FIG. 4C is a diagram of still another example of the screen display by the display panel of the display device according to the first embodiment.
Figure 4B:
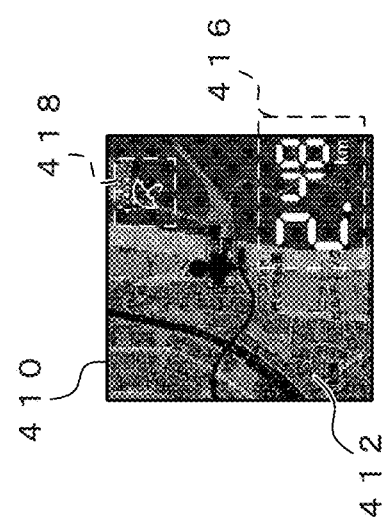
FIG. 4B is a diagram of still another example of the screen display by the display panel of the display device according to the first embodiment.
Figure 4A:
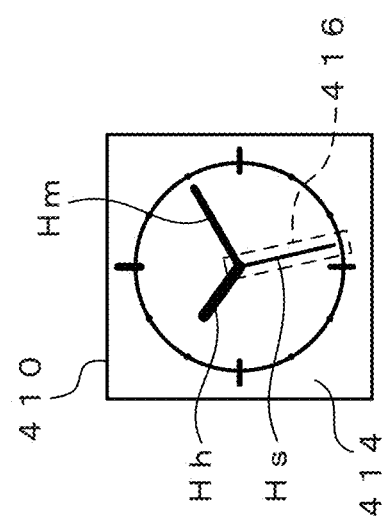
FIG. 4A is a diagram of another example of the screen display by the display panel of the display device according to the first embodiment.

FIG. 3 depicts a timing chart of an example of the display device control method according to the present embodiment and an example of screen display by the display panel at each timing. Here, when necessary, description is made with reference to the above-described structure of the electronic device (refer to FIG. 2). FIG. 4A to FIG. 4C are diagrams of other examples of the screen display by the display panel of the display device according to the present embodiment.

In the display device control method according to the present embodiment, first, when the electronic device 10 worn on the body of the user (or carried by the user) is turned on for operation, driving power is supplied from the power supply section 500 and, for example, a normal operation for high-functionality display is performed, as depicted in (a) of the timing chart in a lower layer of FIG. 3. In this normal operation, image data for one screen of the display panel 410 generated by the arithmetic circuit section 100 is sequentially transmitted via the interface I/F(A) and stored in the frame memory 421 of the driver circuit 420. The image data stored in the frame memory 421 is outputted by the driver circuit 420 to the display panel 410 at a predetermined frame rate, and a predetermined high-functionality image is displayed on the entire display area of the display panel 410.

Here, in the high-functionality display, for example, a high-functionality image 412 is displayed, as depicted in (a) of screen display in an upper layer of FIG. 3. Also, the backlight of the light source section 300 provided on the back surface side of the display panel 410 is controlled to be in a lit state. As a result, by the light of the backlight being applied from the back surface side of the display panel 410, the high-functionality image 412 displayed on the display panel 410 is projected onto the user view field side and is visually recognized.

Next, in the above-described high-functionality display, when image switching occurs by an application being executed in the electronic device 10 or by a user input operation (abbreviated as "user operation" in FIG. 3), the arithmetic circuit section 100 causes a predetermined image to be displayed in accordance with the application or the input operation, as depicted in (b) of the timing chart in the lower layer of FIG. 3 and (b) of screen display in the upper layer of FIG. 3.

Here, the user input operation corresponds to, for example, an intentional operation by the user on the touch panel of the input operating section 120 or on the button switch of the input operating section 220 or a motion of lifting the electronic device 10 in a stationary state (such as a state where the electronic device 10 remains stationary on a table) or applying specific vibrations, impact, tilting, or the like. The operation on the touch panel of the input operating section 120 is directly detected by the arithmetic circuit section 100. Also, the operation on the button switch of the input operating section 220 is detected by the arithmetic circuit section 200, and the detection result is transmitted via a link signal to the arithmetic circuit section 100. Also, regarding the motion of lifting the electronic device 10 or applying specific vibrations, impact, tilting, or the like, an output from a sensor (for example, an acceleration sensor) of the sensor section 210 is monitored by the arithmetic circuit section 200, and the monitoring result is transmitted via a link signal to the arithmetic circuit section 100.

At the image switching timing, the arithmetic circuit section 100 generates image data for one screen in accordance with the application or input operation, and causes the image data to be written in the frame memory 421 of the driver circuit 420 via the interface I/F(A). As a result, a predetermined image is displayed in the entire display area of the display panel 410 in accordance with the application or input operation, as depicted (c) of the timing chart in the lower layer of FIG. 3. Here, since control is performed in which image data is generated by the (high-power, high-performance) arithmetic circuit section 100 and a predetermined image is displayed on the display panel 410, the image displayed on the display panel 410 is instantaneously switched from the above-described high-functionality image 412 to the predetermined image in accordance with the application or input operation.

When the image after switching by the arithmetic circuit section 100 is, for example, an image having relatively small-volume image data or an image with a small number of updates or a small change in screen display (hereinafter collectively referred to as "simple image" for convenience of explanation), the arithmetic circuit section 100 transmits a link signal for the notification of the shift of the operation status to the arithmetic circuit section 200 via the link communicating section 150. As a result, the arithmetic circuit section 100 shifts most of the functions including the operation of generating image data and writing the image data in the driver circuit 420 to an non-operating state.

The arithmetic circuit section 200 may instruct the arithmetic circuit section 100 to enter a non-operating state.

Here, in (c) of screen display in the upper layer of FIG. 3, an image indicating hours, minutes, and seconds of "12:05:01" for use in so-called digital clock display is depicted as an example of the simple image 414. Also, the shift of the arithmetic circuit section 100 to a power saving state is achieved by, for example, the arithmetic circuit section 100 or the arithmetic circuit section 200 shutting off or saving the supply of driving power to the arithmetic circuit section 100 from the power supply section 500.

Here, the power saving state is a state in which power is controlled to be supplied only to basic components, which is, for example, a state of S1 or S3 called standby or sleep among sleeping modes S0 to S5 defined in ACPI (Advanced Configuration and Power Interface) that is a unified standard published regarding power supply control and components. Note that the power saving state may be called a standby mode, sleep mode, non-operating state, or the like. On the other hand, when the image after switching by the arithmetic circuit section 100 is a high-functionality image or an image for which a relatively wide area of the display area of the display panel 410 is frequently updated or changed, the arithmetic circuit section 100 does not transmit a link signal to the arithmetic circuit section 200, keeps the normal operation for high-functionality display, and does not enter the power saving state.

Then, the arithmetic circuit section 200 which has received the link signal from the arithmetic circuit section 100 generates image data for a specific area of the image displayed in the entire display area of the display panel 410, in which a specific image continuously updated or changed is displayed. Then, the arithmetic circuit section 200 specifies an address, and sequentially writes the image data in the frame memory 421 of the driver circuit 420 via the interface I/F(B) Here, the specific area has been set to be a display area that is sufficiently narrow as compared to the entire display area of the display panel 410.

As a result, the frame memory 421 is overwritten by image data at a specified address, and a normal operation for area display in which only an image in a specific area of the display area of the display panel 410 is rewritten is continuously performed, as depicted in (d) in the lower layer of the timing chart of FIG. 3. Also, since the image data written in the frame memory 421 of the driver circuit 420 by full display by the arithmetic circuit section 100 described above is retained as it is other than the overwritten image data in the specific area, the state of displaying the pervious image (at full display) is kept in the entire area of the display area of the display panel 410 except the specific area.

This area display continues until an update or change occurs in the image displayed on the display panel 410 in a relatively wide area of the display area of the display panel 410. Specifically, in the area display, as for an hour-minute display area of the simple image 414 indicating hours, minutes, and seconds depicted in (c) of screen display in the upper layer of FIG. 3, the image data written in the frame memory 421 of the driver circuit 420 is retained as it is, and therefore the image is not changed, as depicted in (d) of screen display in an upper layer of FIG. 3. On the other hand, as for a second display area (a specific area) 416 where display is changed every second in the simple image 414 indicating hours, minutes, and seconds, image data is generated by the arithmetic circuit section 200 and written in the frame memory 421 of the driver circuit 420, whereby second display of the display panel is rewritten every second in the order of "01"→"02"→ . . . →"59".

Then, when an update or change occurs in the image displayed on the display panel 410 in an area wider than the above-described specific area 416, such as when hour-minute display where display is changed every minute in addition to a change in second display in (d) of screen display in the upper layer of FIG. 3, the arithmetic circuit section 200 transmits a link signal for the notification of the shift of the operation status to the arithmetic circuit section 100 via the link communicating section 250. As a result, the arithmetic circuit section 200 temporarily stops or interrupts the operation of generating image data for the specific area 416 and writing the image data in the driver circuit 420.

On the other hand, the arithmetic circuit section 100 which has received the link signal from the arithmetic circuit section 200 returns from the power saving state, and performs full display in which image data for the entire display area with hour-minute-second display is generated and written in the driver circuit 420, as depicted in (e) of the timing chart in a lower layer of FIG. 3. Here, the return of the arithmetic circuit section 100 from the power saving state to the normal operation is achieved by, for example, the arithmetic circuit section 100 or the arithmetic circuit section 200 supplying or restoring driving power from the power supply section 500 to the arithmetic circuit section 100.

That is, when second display of the simple image 414 having hour-minute-second display reaches "59", the arithmetic circuit section 200 does not generate or write image data of the next second display of "00".

On the other hand, the arithmetic circuit section 100 generates image data including hour-minute display in addition to second display, writes the image data in the frame memory 421 of the driver circuit 420, and thereby causes an image of "12:06:00" to be displayed on the entire display area of the display panel 410, as depicted in (e) of screen display in the upper layer of FIG. 3. This hour-minute-second display on the display panel 410 is sequentially rewritten every second as "12:06:00"→"12:07:00"→ . . . . Then, the arithmetic circuit section 100 transmits a link signal to the arithmetic circuit section 200 for entering the power saving state again.

That is, the arithmetic circuit section 100 is theoretically set in the power saving state for fifty-nine seconds.

By receiving the link signal from the arithmetic circuit section 100, as with (d) of the timing chart in the lower layer of FIG. 3, the arithmetic circuit section 200 performs area display in which the image only for the specific area 416 for second display in the display area of the display panel 410 is rewritten, as depicted in (f) of the timing chart in the lower layer of FIG. 3.

Next, in the above-described area display, when image switching occurs by the application being executed by the electronic device 10 or a user input operation as depicted in (g) of the timing chart in the lower layer of FIG. 3 and (g) of screen display in the upper layer of FIG. 3, the arithmetic circuit section 200 transmits a link signal for the notification of the shift of the operation status to the arithmetic circuit section 100 via the link communicating section 250. As a result, the arithmetic circuit section 200 stops or interrupts the operation of generating image data for the specific area 416 and writing the image data in the driver circuit 420.

On the other hand, the arithmetic circuit section 100 which has received the link signal from the arithmetic circuit section 200 returns from the power saving state, generates image data in accordance with the application or input operation, and writes the image data in the frame memory 421 of the driver circuit 420, as depicted in (h) of the timing chart in the lower layer of FIG. 3. As a result, full display is performed in which a predetermined image is displayed in the entire display area of the display panel 410 in accordance with the application or the input operation. In this case as well, since control is performed in which image data is generated by the (high-power, high-performance) arithmetic circuit section 100 and an image is displayed on the display panel 410, the image displayed on the display panel 410 is instantaneously switched to the predetermined image in accordance with the application or the input operation.

Here, when the image after switching by the arithmetic circuit section 100 is the high-functionality image 412 as depicted in (h) of screen display in the upper layer of FIG. 3, or is an image by which a relatively wide area of the display area of the display panel 410 is frequently updated or changed, the arithmetic circuit section 100 continuously performs the normal operation for high-functionality display.

On the other hand, when the image after switching by the arithmetic circuit section 100 is a simple image, the arithmetic circuit section 100 transmits a link signal to the arithmetic circuit section 200 and, as with (d) and (f) of the timing chart in the lower layer of FIG. 3 described above, the arithmetic circuit section 200 performs area display in which the image only for the specific area 416 in the display area of the display panel 410 is rewritten.

In the present embodiment, the series of processing operations described above are repeatedly performed. Here, the arithmetic circuit sections 100 and 200 always monitor an input operation for interrupting or ending the processing operations and a change in the operation status, and forcibly end the processing operations when an input operation or status change is detected. Specifically, the arithmetic circuit sections 100 and 200 detect a shutoff (OFF) operation on the operation power supply by the user, a reduction in the remaining amount of the battery in the power supply section 500, an anomaly in the function or application being executed, and the like, and forcibly interrupt and end the series of processing operations.

Also, in the series of processing operations described above, in a state where the arithmetic circuit section 100 is performing high-functionality display or has returned from the power saving state to the normal operation, the arithmetic circuit section 200 stops or interrupts at least the operation of generating image data and writing the image data in the driver circuit 420, and performs the normal operation in which a sensing operation by the sensor section 210 and the like are performed with low power consumption.

In the present embodiment, as an example of screen display, the simple image 414 including hour-minute-second display such as so-called digital clock display is displayed on the display panel 410, image data is generated by the arithmetic circuit section 200 for the specific area 416 for second display, and the second display on the display panel 410 is sequentially rewritten (FIG. 3). However, the present invention is not limited thereto.

In another example of the screen display according to the present invention, the simple image 414 including an hour hand, a minute hand, and a second hand (Hh, Hm, and Hs, respectively) such as those of analog clock display is displayed on the display panel 410 as depicted in FIG. 4A, image data is generated by the arithmetic circuit section 200 for the specific area 416 for displaying the second hand Hs, and the second display on the display panel 410 is rewritten every second. Also, for the display of the hour hand Hh and the minute hand Hm, image data may be generated by the arithmetic circuit section 100, and the entire display area of the display panel 410 may be rewritten every minute. In this case, the specific area 416 is an area which moves or changes with respect to the display area of the display panel 410. That is, unlike the above-described embodiment, the specific area 416 is not required to be a fixed area in the display area of the display panel 410, and may be an area whose position is changeable.

Also, in the examples of screen display including hour-minute-second display such as digital clock display described in the above-described embodiment (FIG. 3) and screen display including hour-minute-second display such as analog clock display depicted in FIG. 4A, only the second display or the second hand is taken as a specific area and the display is rewritten by the arithmetic circuit section 200 having a low processing power. However, the present invention is not limited thereto. That is, by display rewriting timing by the arithmetic circuit section 200 having a low processing power being slightly shifted, the display for hour-minute display may be also rewritten by the arithmetic circuit section 200 having a low processing power during an interim of the operation of rewriting the second display every second. As a result of this configuration, the arithmetic circuit section 100 having a high processing power can be set in the power saving state for a longer period of time (for example, a period in which clock display continues on the display panel 410).

In still another example of screen display according to the present invention, the high-functionality image 412 such as a color image based on the image data generated by the arithmetic circuit section 100 is first displayed on the entire display area of the display panel 410, as depicted in FIG. 4B and FIG. 4C. Then, when the number of updates and change in the screen display of the high-functionality image 412 are small, for specific areas 416 and 418 which are areas sufficiently narrow as compared to the display area of the display panel 410 and in which specific images such as characters, figures, and marks that have small data volumes and are continuously updated or changed (that is, with high update frequency) are displayed, image data is generated by the arithmetic circuit section 200 and the images are rewritten sequentially.

In this case as well, a state is kept in which, based on the image data written by the arithmetic circuit section 100 in the frame memory 421 of the driver circuit 420, the high-functionality image 412 including various images such as a map image and a notice image has been displayed on the entire display area of the display panel 410 except the specific areas 416 and 418. Also, based on the image data sequentially written by the arithmetic circuit section 200, various specific images that are continuously updated and changed, such as a character indicating a traveling distance or pace or a mark indicating weather information or motion status, are rewritten in the specific areas 416 and 418 of the display panel 410 where the above-described high-functionality image 412 is being displayed.

Moreover, in the present embodiment, the specific area where an image is sequentially rewritten by the arithmetic circuit section 200 is a display area that is sufficiently narrow as compared with the entire display area of the display panel 410, such as the second display area in the hour-minute-second display. However, the present invention is not limited thereto. That is, the specific area may be any area as long as it has a display area of a size that can be visually recognized favorably by the user without disturbance or interruption in an image when image data generated by the low-power and low-performance arithmetic circuit section 200 is written in the driver circuit 420 via the interface I/F(B) at a slow data transfer rate and an image is displayed on the display panel 410. Therefore, a configuration may be adopted in which, when the data amount of an image (specific image) displayed in the specific area is small or when the number of updates or a change in screen display is small, the specific area is set to be wide with respect to the display area of the display panel 410.

(Verification of Operations and Effects)

Next, operations and effects of the electronic device including the display device and control method therefor according to the present embodiment are specifically described by providing a comparative example.

Figure 5:
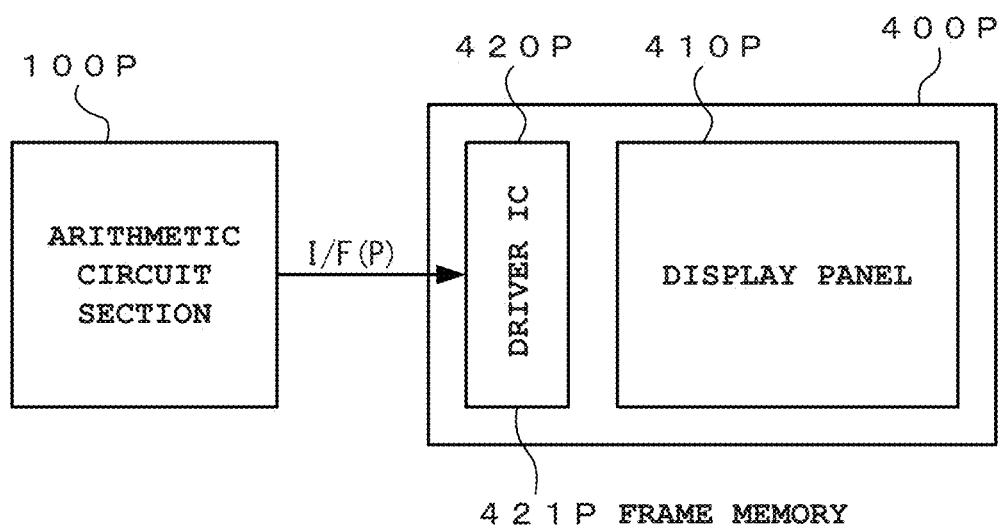
FIG. 5 is a schematic block diagram showing a comparative example for describing operations and effects of the first embodiment.
Figure 6:
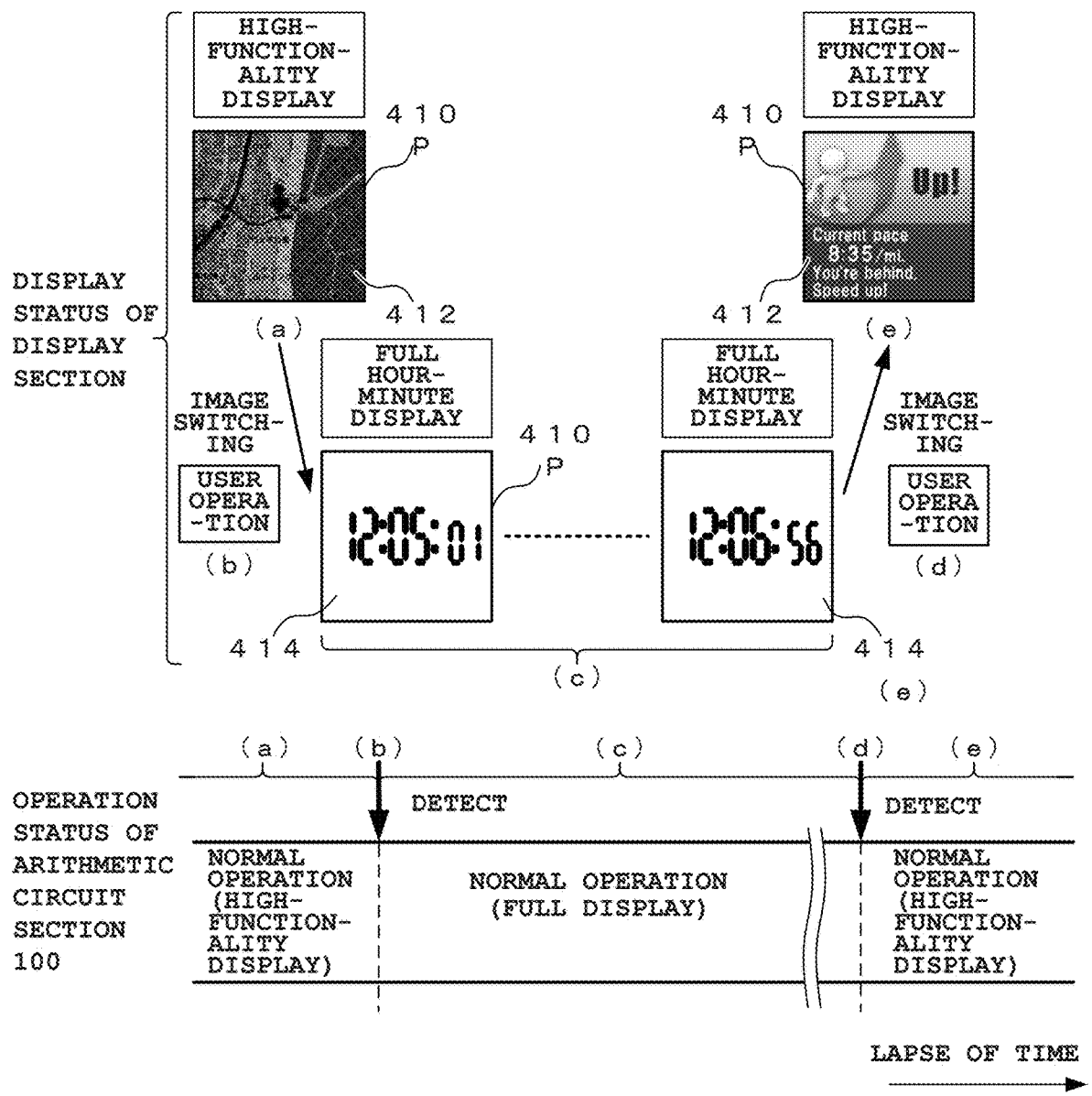
FIG. 6 is a diagram showing a timing chart of a control method in the comparative example and an example of screen display.

FIG. 5 is a schematic block diagram of the comparative example for describing the operations and effects of the present embodiment. FIG. 6 is a diagram showing a timing chart and an example of screen display of the control method in the comparative example. Here, for clarification of comparison between the components and the control method of the present embodiment and those of the comparative example, sections and a control method equivalent to those of the present embodiment are provided with the same reference numerals.

The display device in the comparative example mainly includes, for example, an arithmetic circuit section 100P and a display section 400P, as depicted in FIG. 5. The display section 400P includes a transmission-type display panel 410P and a driver circuit 420P having a frame memory 421P incorporated therein. Although omitted in the drawings, a backlight (light source section) is arranged on the back surface side of the transmission-type display panel 410P.

In this display device, by writing image data generated by the arithmetic circuit section 100P in accordance with an application or an input operation in the frame memory 421P of the driver circuit 420, a predetermined image is displayed on the entire display area of the display panel 410P, as with the above-described embodiment. Then, by light of the backlight being applied from the back surface side of the display panel 410P, the image displayed on the display panel 410P is projected onto the user view field side and is visually recognized.

Here, to display a high-functionality image such as a high-definition color image, smooth moving picture, or animation described above on the display panel 410P, it is required to adopt an arithmetic circuit with a relatively high processing power and high power consumption (a high-power, high-performance processor) as the arithmetic circuit section 100P. In addition, it is required to connect the arithmetic circuit section 100P and the driver circuit 420P via an interface I/F(P) meeting a standard with a relatively high data transfer rate, such as a MIPI or a parallel interface.

In this display device, for example, even if the simple image 414 is displayed on the display panel 410P as depicted in (c) of FIG. 6, when the simple image 414 includes an image being continuously updated or changed (for example, the second display in the drawing), it is required to continuously perform an operation of generating image data for the entire display area of the display panel 410P by the arithmetic circuit section 100P and writing the image data in the driver circuit 420P via the interface I/F(P). Therefore, it is impossible to cause the arithmetic circuit section 100P to enter a power saving state.

On the other hand, when an image whose number of updates or change in screen display (for example, a map or exercise support image) is small is to be displayed on the display panel 410P for a predetermined period as depicted in (a) and (e) of FIG. 6, even if the image is the high-functionality image 412, the image data generated by the arithmetic circuit section 100P and written in the driver circuit 420P is retained in the frame memory 421P. Therefore, during the display of this image, the arithmetic circuit section 100P can enter the power saving state and maintain this state until a next image data generating request is given.

Note that the examples of the timings and screen display depicted in FIG. 6 are to describe the control method when the high-functionality image 412 is switched to the simple image 414 having the hour-minute-second display by a user input operation or the like while the high-functionality image 412 is being displayed as in the case of the above-described embodiment of the present invention.

As such, in the display device of the comparative example, the display status of the display section 400P is controlled singly by the arithmetic circuit section 100P. Therefore, when an image being frequently updated or changed is displayed, it is required to generate image data more frequently by the arithmetic circuit section 100P and write the image data in the driver circuit 420P. Thus, the arithmetic circuit section 100P cannot enter the power saving state during the display of this image, and the power consumption of the arithmetic circuit section 100P cannot be sufficiently reduced. Moreover, even when the simple image 414 is displayed on the display panel 410P, it is required to use the (high-power, high-performance) arithmetic circuit section 100P. Therefore, the processing performance of the arithmetic circuit section 100P is in a surplus state, and the arithmetic circuit section 100P cannot be effectively used.

By contrast, in the above-described embodiment, two arithmetic circuit sections 100 and 200 having different processing powers are provided, and connected to the driver circuit 420 of the display section 400 via the separate interfaces I/F(A) and I/F(B), respectively. Also, the driver circuit 420 is structured to have the frame memory 421 incorporated therein, and sequentially overwrites image data written separately by the arithmetic circuit sections 100 and 200.

When the high-functionality image 412 is displayed on the display panel 410, image data is generated by the arithmetic circuit section 100 having a high processing power, and written in the driver circuit 420 via the interface I/F(A).

When the simple image 414 is displayed on the display panel 410, the arithmetic circuit section 100 and the arithmetic circuit section 200 operates in conjunction with each other so that, for the specific area 416 in which a specific image being continuously updated and changed (with high update frequency) or a specific image having a small data volume is displayed, image data is generated by the arithmetic circuit section 200 having a low processing power, and sequentially written in the driver circuit 420 via the interface I/F(B). During this period, the arithmetic circuit section 100 enters the power saving state, and this state is kept.

As such, in the present embodiment, a high-functionality image such as a high-definition color image, smooth moving picture, or animation display can be favorably displayed by the arithmetic circuit section 100 having a high processing power, and various information can be favorably provided to the user. Also, a simple image such as an image having small-volume image data or an image whose number of updates or change in screen display is small can be favorably displayed by the arithmetic circuit section 200 having a low processing power being operated together, so that the arithmetic circuit section 100 having a high processing power can enter the power saving state as much as possible.

Therefore, in the present embodiment, when a processing load due to image display by the display section 400 is relatively small, part of the functions is performed by the arithmetic circuit section 200 which is performing operations continuously although its processing power is low, in place of the arithmetic circuit section 100 having a high processing power, whereby the period in which the arithmetic circuit section 100 is in the power saving state is extended to a maximum. Therefore, the power consumption of the arithmetic circuit section 100 can be reduced, and the driving time of the electronic device can be improved.

Second Embodiment

Next, a second embodiment of the electronic device including the display device according to the present invention is described in detail with reference to the drawings.

FIG. 7 is a schematic block diagram of the second embodiment of the electronic device including the display device according to the present invention. Here, sections equivalent to those of the above-described first embodiment are provided with the same reference numerals and described briefly. FIG. 8A to FIG. 8D are diagrams showing examples of screen display by the display device according to the present embodiment.

In the first embodiment, only one display panel 410 is provided to the display section 400 and the display status of the display panel 410 is controlled by the arithmetic circuit section 100 and the arithmetic circuit section 200 connected to the driver circuit 420 having a plurality of interfaces. The second embodiment has a feature in which a plurality of (here, two) display panels are provided to the display section 400 and a display pattern in which the display status of a first display panel is controlled by the arithmetic circuit section 100 and the display status of a second display panel is controlled by the arithmetic circuit section 200 and a display pattern in which the display status of the first display panel is controlled by the arithmetic circuit section 100 and the arithmetic circuit section 200 are provided.

The electronic device 10 according to the second embodiment mainly includes, for example, a set of two arithmetic circuit section 100 and arithmetic circuit section 200 having different processing powers and a display section 400 including a set of two display panels (first and second display panels) 410 and 430, as depicted in FIG. 7. Note that the other sections of the present embodiment depicted in FIG. 7 are equivalent to those of the above-described first embodiment and therefore are not described herein.

The display section 400 includes the driver circuit 420 having the frame memory 421 for displaying an image on the display panel 410 and a driver circuit 440 having a frame memory 441 for displaying an image on the display panel 430.

Here, the display panel 410 and the driver circuit 420 each have a structure and a function similar to those of the first embodiment, and the driver circuit 420 is connected to the arithmetic circuit section 100 and the arithmetic circuit section 200 via the interfaces I/F(A) and I/F(B) whose data transfer rates are different from each other. That is, a predetermined image is displayed on the display panel 410 based on image data generated by the arithmetic circuit section 100 and the arithmetic circuit section 200.

Also, the driver circuit 440 is connected to the arithmetic circuit section 200 via an interface I/F(C) meeting a standard with a relatively slow data transfer rate such as a SPI. That is, a predetermined image is displayed on the display panel 430 based on image data generated by the arithmetic circuit section 200.

Note that the image data generated by the arithmetic circuit section 200 is controlled to be selectively written in one of the driver circuit 420 and the driver circuit 440 in accordance with the display pattern of the display section 400.

Also, in the present embodiment, a transmission-type display panel is applied to at least one of the display panels 410 and 430, and the backlight of the light source section 300 is arranged on the back surface side of the transmission-type display panel. Here, the display panels 410 and 430 may be arranged in parallel without being superimposed on each other in a planar view when viewed from the user view field side, or may be arranged independently. Also, in a case where both of the display panels 410 and 430 are transmission-type display panels, the display panels 410 and 430 may be arranged to be superposed on each other in a planar view and the backlight may be arranged on the backmost surface side.

As the arithmetic circuit section 100 which controls the display status of the display panel 410, an arithmetic circuit having a relatively high processing power (a high-power and high-performance processor) is adopted, as described in the first embodiment. Accordingly, a display panel capable of achieving high-functionality display can be adopted as the display panel 410. Specifically, as the display panel 410, a transmission-type TFT color liquid-crystal panel or the like can be adopted, as with the above-described first embodiment.

On the other hand, as the arithmetic circuit section 200 which controls the display status of the display panel 410 or the display panel 430, an arithmetic circuit having a relatively low processing power (a low-power and low-performance processor) is adopted, as described in the first embodiment. Here, the arithmetic circuit section 200 selectively controls one of the display status of the display panel 410 and the display status of the display panel 430 in accordance with the display pattern of the display section 400. Accordingly, a display panel that is driven for display with relatively low power consumption, and screen display that is displayed with low power consumption are adopted for the display panel 430.

Specifically, as the display panel 430, a PN (Polymer Network)-type or PD (Polymer Dispersed)-type liquid-crystal panel with high reflection and excellent outdoor visual recognition or a display panel for use in electronic paper can be favorably applied. In a case where clock display, simple figure display, still picture display, and the display of an image whose number of updates or change in screen display is small, which can be driven for display with low power consumption, are performed on the display panel 430, the display panel 430 is not limited to a PN-type or a PD-type liquid-crystal panel, an electronic paper, or the like, and a TFT color liquid-crystal panel or the like may be adopted, as with the display panel 410.

In the above-structured display device, control is performed such that the first display pattern and the second pattern are selectively performed. In the first display pattern, high-functionality display is performed on the display panel 410 by the arithmetic circuit section 100, and simple display is performed on the display panel 430 by the arithmetic circuit section 200. In the second display pattern, a simple image is displayed on the display panel 410 by the arithmetic circuit section 100 and the arithmetic circuit section 200 with low power consumption, as described in the first embodiment.

In this display pattern control in the display section 400, the arithmetic circuit section 100 and the arithmetic circuit section 200 are linked and synchronized with each other by a link signal being transmitted and received via the link communicating sections 150 and 250, and image data to be generated by the arithmetic circuit section 100 and the arithmetic circuit section 200 and the write destination of the image data are determined in accordance with the display status of each of the display panels 410 and 430.

That is, in the first display pattern, image data generated by the arithmetic circuit section 100 is written in the driver circuit 420 via the interface I/F(A), and image data generated by the arithmetic circuit section 200 is written in the driver circuit 440 via the interface I/F(C).

On the other hand, in the first display pattern, image data generated by the arithmetic circuit section 100 is written in the driver circuit 420 via the interface I/F(A), and image data generated by the arithmetic circuit section 200 is written in the driver circuit 420 via the interface I/F(B). Here, the image data transmitted from the arithmetic circuit section 100 and the arithmetic circuit section 200 are sequentially stored for overwriting in the frame memory 421 of the driver circuit 420.

As a result, a display status such as that depicted in FIG. 8A to FIG. 8C is achieved in the first display pattern, and a display status such as that depicted in FIG. 8D is achieved in the second display pattern. Note that FIG. 8A to FIG. 8D conceptually depict screen display that is performed when the display panel 410 and the display panel 430 are transmission-type display panels and the display panel 430 arranged on the user view field side and the display panel 410 arranged on the back surface side are superimposed on each other in a planar view.

In the display status depicted in FIG. 8A, control is performed by the arithmetic circuit section 100 such that nothing is displayed on the display panel 410 (a lower layer of FIG. 8A), and the simple image 414 is displayed on the display panel 430 based on image data generated by the arithmetic circuit section 200 (a middle layer of FIG. 8A). In this display status, the simple image 414 displayed on the display panel 430 arranged on the view field side is directly visually recognized by the user, as depicted in an upper layer of FIG. 8A. Also, in this display status, the display status of the display panel 430 can be controlled by the arithmetic circuit section 200 with low power consumption, and the arithmetic circuit section 100 can be set in a power saving state. Therefore, the power consumption of the electronic device 10 can be significantly saved.

Also, in the display status depicted in FIG. 8B, the high-functionality image 412 such as a color image is displayed on the display panel 410 based on image data generated by the arithmetic circuit section 100 (a lower layer of FIG. 8B), and the arithmetic circuit section 200 performs control such that nothing is displayed on the display panel 430 (in practice, a full-transparent state is set) (in a middle layer of FIG. 8B). In this display status, the high-functionality image 412 displayed on the display panel 410 arranged on the back surface side passes through the display panel 430 to be visually recognized by the user, as depicted in an upper layer of FIG. 8B. Also, in this display status, an operation of generating image data and writing the image data in the driver circuit 440 by the arithmetic circuit section 200 can be stopped or interrupted. Therefore, the arithmetic circuit section 200 can be operated with low power consumption, and the power consumption of the display panel 430 and the driver circuit 440 can be saved, whereby the power consumption of the electronic device 10 can be saved.

Moreover, in the display status depicted in FIG. 8C, the high-functionality image 412 such as a color image is displayed on the display panel 410 based on image data generated by the arithmetic circuit section 100 (a lower layer of FIG. 8C) and the simple image 414 is displayed on the display panel 430 based on image data generated by the arithmetic circuit section 200 (a middle layer of FIG. BC). In this display status, the high-functionality image 412 displayed on the display panel 410 is combined with (or superimposed on) the simple image 414 displayed on the display panel 430 when passing through the display panel 430 as depicted in an upper layer of FIG. 8C. As a result, images of various display forms are visually recognized by the user.

Furthermore, in the display status depicted in FIG. 8D, the high-functionality image 412 such as a color image is displayed in the entire display area of the display panel 410 based on image data generated by the arithmetic circuit section 100. In addition, based on image data generated by the arithmetic circuit section 200, specific images such as a character, figure, and mark which are continuously updated or changed are displayed in specific areas 416 and 418 of the display area of the display panel 410 (a lower layer of FIG. 8D). That is, a predetermined image including specific images is displayed on the display panel 410, as with the above-described first embodiment. Also, the arithmetic circuit section 200 performs control such that nothing is displayed on the display panel 430 (in practice, full-transparent state is set) (in a middle layer of FIG. 8D). In this display status, the high-functionality image 412 including the specific images displayed on the display panel 410 arranged on the back surface side passes through the display panel 430 to be visually recognized by the user, as depicted in an upper layer of FIG. 8D. Also, in this display status, an image of a display form equivalent to that of the combined image depicted in FIG. 8C can be displayed by one display panel 410. Also, when the specific images are being displayed by the arithmetic circuit section 200, the arithmetic circuit section 100 can be in a power saving state. As a result, the power consumption of the electronic device 10 can be significantly saved.

Here, the arithmetic circuit section 200 may instruct the arithmetic circuit section 100 to enter a non-operating state.

As described above, the present embodiment is provided with two display panels 410 and 430. Accordingly, images of more various display forms can be provided and whereby various information can be favorably provided to the user. Also, when a processing load due to image display in the display section 400 is relatively small, part of the functions can be performed by the arithmetic circuit section 200 which is performing operations continuously although its processing power is low, in place of the arithmetic circuit section 100 having a high processing power, whereby the arithmetic circuit section 100 can enter a power saving state, as with the above-described first embodiment. As a result, the power saving state of the arithmetic circuit section 100 can be extended to a maximum, so that the power consumption of the arithmetic circuit section 100 can be reduced and the driving time of the electronic device can be improved.

While the present invention has been described with reference to the preferred embodiments, it is intended that the invention be not limited by any of the details of the description therein but includes all the embodiments which fall within the scope of the appended claims.

What is claimed is:

1. A display device comprising:
   a display section which displays image data;
   a first processor;
   a second processor having lower power consumption than the first processor; and
   a driver circuit which is connected to each of the first processor and the second processor via a separate signal line, which is accessed via a first interface and a second interface having different standards, and in which a frame memory is incorporated,
   wherein the driver circuit is configured such that (i) in a state where image data from one of the first processor and the second processor has been written in the frame memory, when image data is written from the other one of the first processor and the second processor, overwriting is performed such that the latter image data becomes effective, and (ii) by specifying an address at a time of writing the image data, only image data at a corresponding address of the image data already written in the frame memory is overwritten,
   wherein a display status of the display section is selectively controlled between a first display status and a second display status different from the first display status,
   wherein the first display status is a display status in which image data for one screen generated by the first processor is sequentially transmitted in units of the one screen at a predetermined frame rate via the first interface and stored in the frame memory of the driver circuit, and, from the image data stored in the frame memory, by the driver circuit, a predetermined image is displayed on an entire display area of the display section,
   wherein the second display status is a display status in which (i) the first processor, when the predetermined image is switched to a simple image in accordance with an application or a user input operation, shifts to a power saving state where most of functions including an operation of generating image data and writing the image data in the driver circuit are in a non-operating state, and (ii) the second processor generates image data for a specific area of the image displayed in the entire display area of the display section, in which a specific image continuously updated or changed is displayed, and specifies an address and sequentially writes the image data in the frame memory of the driver circuit via the second interface, whereby an image of the specified address in the frame memory is overwritten, and an image is rewritten only for the specific area, and
   wherein the simple image is an image having a data volume lower than a predetermined data volume, or is an image having a number of updates smaller than a predetermined number of updates or having a change in screen display smaller than a predetermined change in screen display.

2. The display device according to claim 1, wherein, in the second display status, the image data generated for the specific area is sequentially written in the frame memory, whereby the image of the specified address in the frame memory is overwritten, and the image is rewritten only for the specific area, and further, a state of displaying a previous image is kept in the entire display area of the display section except the specific area.

3. The display device according to claim 1, wherein the specific area is set to be a display area that is sufficiently narrow as compared to the entire display area of the display section.

4. The display device according to claim 1, wherein the second display status is a clock display status.

5. The display device according to claim 4, wherein:
the second display status is a status where display of an image indicating hour, minute, and second is performed as the specific image; and
for a specific area of second display where display is changed every second in the image indicating hour, minute, and second, image data is generated by the second processor and written in the frame memory of the driver circuit, whereby second display is rewritten every second only for the specific area of second display.

6. The display device according to claim 4, wherein:
the display of the image indicating hour, minute, and second that is performed as the specific image in the second display status is an analog display of a clock; and
the specific area of second display is a second hand of the analog display of the clock.

7. The display device according to claim 1, wherein, when image switching occurs in accordance with an application or a user input operation while the first processor is in the power saving state, the second processor transmits a shift of an operation status to the first processor, the first processor returns from the power saving state, and the second processor stops or interrupts an operation of generating image data for the specific area and writing the image data in the driver circuit.

8. The display device according to claim 1, wherein the first interface has a relatively high transfer rate, and the second interface has a relatively low transfer rate.

9. The display device according to claim 1, wherein the power saving state of the first processor is a sleeping mode defined in ACPI (Advanced Configuration and Power Interface).

10. The display device according to claim 1, wherein the first processor and the second processor are mounted on a single semiconductor in a form of a system-on-a-chip.

11. The display device according to claim 1, wherein the display section includes a first display section and a second display section.

12. The display device according to claim 11, wherein the display device selectively controls to perform display in a first display pattern, in which the first display section is controlled by the first processor and the second display section is controlled by the second processor, and in a second display pattern, in which the first display section is controlled by the first processor and the second processor.

13. The display device according to claim 11, wherein an image is displayed in an entire display area of the first display section based on image data generated by the first processor and, based on image data generated by the second processor, specific images such as a character, figure, and mark which are continuously updated or changed are displayed in specific areas of the display area of the first display section.

14. A display control method of a display device including a display section which displays image data, a first processor, a second processor having lower power consumption than the first processor, and a driver circuit which is connected to each of the first processor and the second processor via a separate signal line, which is accessed via a first interface and a second interface having different standards, and in which a frame memory is incorporated, the method comprising:
controlling the driver circuit such that (i) in a state where image data from one of the first processor and the second processor has been written in the frame memory, when image data is written from the other one of the first processor and the second processor, overwriting is performed such that the latter image data becomes effective, and (ii) by specifying an address at a time of writing the image data, only image data at a corresponding address of the image data already written in the frame memory is overwritten; and
selectively controlling a display status of the display section between a first display status and a second display status different from the first display status,
wherein the first display status is a display status in which image data for one screen generated by the first processor is sequentially transmitted in units of the one screen at a predetermined frame rate via the first interface and stored in the frame memory of the driver circuit, and, from the image data stored in the frame memory, by the driver circuit, a predetermined image is displayed on an entire display area of the display section,
wherein the second display status is a display status in which (i) the first processor, when the predetermined image is switched to a simple image in accordance with an application or a user input operation, shifts to a power saving state where most of functions including an operation of generating image data and writing the image data in the driver circuit are in a non-operating state, and (ii) the second processor generates image data for a specific area of the image displayed in the entire display area of the display section, in which a specific image continuously updated or changed is displayed, and specifies an address and sequentially writes the image data in the frame memory of the driver circuit via the second interface, whereby an image of the specified address in the frame memory is overwritten, and an image is rewritten only for the specific area, and
wherein the simple image is an image having a data volume lower than a predetermined data volume, or is an image having a number of updates smaller than a predetermined number of updates or having a change in screen display smaller than a predetermined change in screen display.

15. A non-transitory computer-readable storage medium having a program stored thereon that is executable by a computer to perform the display control method according to claim 14.

* * * * *